(12) United States Patent
Olkin

(10) Patent No.: US 6,859,822 B2
(45) Date of Patent: Feb. 22, 2005

(54) INTERACTIVE E-MAIL STATEMENT

(75) Inventor: Terry M. Olkin, Los Gatos, CA (US)

(73) Assignee: Secure Data In Motion, Inc., San Mateo, CA (US)

( * ) Notice: Subject to any disclaimer, the term of this patent is extended or adjusted under 35 U.S.C. 154(b) by 0 days.

(21) Appl. No.: 10/248,089

(22) Filed: Dec. 17, 2002

(65) Prior Publication Data

US 2004/0117447 A1 Jun. 17, 2004

(51) Int. Cl.[7] .............................................. G06F 13/00
(52) U.S. Cl. ..................... 709/206; 709/203; 709/217; 709/219
(58) Field of Search ................................. 709/219, 220, 709/204, 206, 205, 203, 217; 705/40, 34

(56) References Cited

U.S. PATENT DOCUMENTS

| | | | | |
|---|---|---|---|---|
| 6,070,185 | A | * | 5/2000 | Anupam et al. ............ 709/204 |
| 6,078,907 | A | * | 6/2000 | Lamm ........................ 705/40 |
| 6,128,603 | A | * | 10/2000 | Dent et al. ................... 705/40 |
| 6,285,991 | B1 | * | 9/2001 | Powar ......................... 705/76 |
| 6,295,551 | B1 | * | 9/2001 | Roberts et al. ............. 709/205 |
| 6,385,595 | B1 | * | 5/2002 | Kolling et al. ............... 705/40 |
| 6,707,811 | B2 | * | 3/2004 | Greenberg et al. .......... 370/352 |
| 2001/0038624 | A1 | * | 11/2001 | Greenberg et al. .......... 370/352 |
| 2002/0085704 | A1 | * | 7/2002 | Shires ..................... 379/265.04 |
| 2002/0085705 | A1 | * | 7/2002 | Shires ..................... 379/265.04 |

OTHER PUBLICATIONS

Goldberg et al., "Active Mail—A Framework for Implimenting Groupware," Nov., 1992, CSCW 92 Proceedings, ACM Press.*
Braverman, Account Management Tool Fo E–Billing System US 2002/0052812, May 2, 2002.*

* cited by examiner

Primary Examiner—Moustafa M. Meky
(74) Attorney, Agent, or Firm—Raymond E. Roberts; Intellectual Property Law Offices

(57) ABSTRACT

A method for interactively communicating with regard to a statement in e-mail form including a tag and a link. The statement is communicated from a first computer to a second via a network. The first computer is operated by the statement provider and the second is operated by a clerk associated with the statement receiver. A client software is provided to the second computer automatically based on said tag being present in the statement. An instant messaging session between the second computer and a third computer is employed based on selective link activation by the clerk. The third computer (potentially the same as the first) is operated by a service representative associated with the provider.

18 Claims, 3 Drawing Sheets

INTERACTIVE E-MAIL STATEMENT

BACKGROUND OF INVENTION

1. Technical Field

The present invention relates generally to communication of and about electronic document forms of statements and reports, and more particularly to providing such documents by e-mail with integrated capability to respond by instant messaging or chat session.

2. Background Art

Conventionally, documents used as statements and reports (collectively "statements" herein) are prepared on paper and include data stating like monthly billings, lab results, etc. Such statements are prepared by enterprises acting as vendors of goods or services, or by organizations that need to regularly communicate with their clients on standard matters. Conversely, the statements are intended for other enterprises or organizations acting as goods or services customers, or as clients that receive regular, detail intensive communications on standard matters.

Of particular present interest are how statements are then sent from the preparing parties to the receiving parties, and then how these parties handle follow up communications. Traditionally, the statements are sent via a conventional postal or courier service. Of course, as is well known, this is a notoriously slow, serial, and is an expensive process, and it becomes particularly so whenever a receiving party has to follow up with a providing party on details or issues in the statement. That very common situation may require drafting a letter and sending it by mail or courier back to the providing party. Alternately, the receiving party can try to reach the providing party by telephone, with a high attendant likelihood that the provider's best suited representative for handling the matter will be unavailable, or not have a copy of the statement or other information readily available to address the questions being raised.

Despite the advent and growing availability of e-mail, simple follow up transactions regarding statements can still take days. In fact, trying to follow up via e-mail can be worse, since it tends to be addressed to individuals rather than to roles or departments, i.e., not to entities like an Accounting Clerk or a Dept. Thus, even if an original statement includes a contact e-mail address, it may be for a person who is on vacation, or who has left the organization, or who has such a work load that it is days before they can sort through their e-mail and delegate matters.

For example, if a conventional statement is a bill in which merely one item requires clarification, resolving that is likely to require a protracted dialog that can be expected to substantially delay payment. Pragmatically, it is the very nature of the information in statements to require such clarification or correction and, continuing with billing as just our example, that is why enterprises and organizations today are still compelled to set payment terms of at least 30 days, and to then often see considerable delay beyond that despite whatever early payment incentives they may provide.

Another example of a problem for statement providers is the cost of fielding telesales support. Supporting customers via phone is a notoriously expensive proposition. These calls are measured in time and most of the time spent on the phone is merely navigating to the "right" representative and then getting the basic information from the client such that both parties are talking about the same thing, i.e., establishing the same context. Efforts to date to migrate such support to e-mail has also, by in large, been a failure. When a customer has a problem they usually want to handle it immediately, or at least in a relatively short time period. An aspect of the problem here is that there presently is no assurance that an e-mail will be responded to, in short order or ever. Even when providers implement e-mail support that is highly responsive, they often find that their customers still opt to communicate by telephone.

It follows that what is needed is an improved system to communicate statements and to then conduct further communications about them.

SUMMARY OF INVENTION

Accordingly, it is an object of the present invention to provide an improved system to communicate statements and to then conduct further communications about them.

Briefly, one preferred embodiment of the present invention is a method for interactively communicating with regard to a statement. The statement is prepared, in e-mail form and including a tag and a link, at a first computer system operated by a provider of the statement. The statement is then communicated from the first computer system to a second computer system via a network. The second computer system is operated by a clerk associated with a receiver of the statement. A client software is provided to the second computer system automatically, based on the tag being present in the statement. An instant messaging session is then employed between the second computer system of the clerk and a third computer system, based on the clerk selectively activating the link. The third computer system is operated by a service representative associated with the provider (and may potentially be the same as the first computer system).

Briefly, another preferred embodiment of the present invention is a method for constructing an interactive statement. An e-mail is prepared, including data regarding the subject matter of the statement, at a first computer system operated by a provider of the statement. A tag is included in the e-mail, wherein the tag is suitable for providing an instant messaging client software in a second computer system operated by a clerk associated with a receiver of the statement. A link is also included in the e-mail, one suitable for selective activation of the client software by the clerk to employ an instant messaging session with a third computer system (potentially the same one as the first computer system) operated by a service representative associated with the provider.

Briefly, another preferred embodiment of the present invention is a method for interactively communicating about a statement. The statement, including a tag and a link, is received at a first computer system operated by a clerk associated with a receiver of the statement. An instant messaging client software is provided in the first computer system automatically, based on the tag being present in the statement. The link is then selectively activated by the clerk to employ an instant messaging session between the first computer system and a second computer system operated by a service representative associated with a provider of the statement:

Briefly, yet another preferred embodiment of the present invention is a statement embodied in a computer readable storage medium. A substantially conventional e-mail is stored in the computer readable storage medium, which is coupled with one of a first computer system of a provider that has created the e-mail, a second computer system of a clerk associated with a receiver that has received the e-mail, or a third computer system of a network where said e-mail is being communicated from the provider to the clerk. A tag is included in said e-mail that is suitable for providing a client software in the second computer system of the clerk, and that client software is suitable for conducting an instant messaging session between the clerk and a service representative associated with the provider. A link is also included in the e-mail, one suitable for selective activation by the clerk to employ said instant messaging session with the service representative.

An advantage of the present invention is the ability to present statements from providers for rapid, complete execution or processing by receivers, wherein clerks associated with the receivers can easily follow up on an resolve any issues in the statements with service representatives associated with the providers.

Another advantage of the invention is immediate contact. The providers sent the statements rapidly, via e-mail and the clerks are able to respond with similar rapidness. The clerks do not dial through nested phone menus, only to likely be on hold for a long time. Alternately, the clerks do not send off conventional e-mails, for answer at indeterminate later times.

Another advantage of the invention is immediate shared context. Both the clerk and the service representative can be looking at the same thing at the same time. The clerk has the statement before them, since a link in it is what as been employed it start the interaction, and the service representative may have the statement (or merely the specific relevant portions) before them by automatic transmission back from the clerk as the interaction commences.

Another advantage of the invention is the ability to reduce customer service center costs. The invention permits service representatives to work with multiple clerks for multiple receivers, effectively simultaneously. While one clerk is typing a question, a service representative can be typing the answer to another. This improves the efficiency and productivity of each service representative, lowering costs, wait times, and total issue resolution times.

Another advantage of the invention is the ability to not have to build traditional call centers (with their inherent telecommunications infrastructure). The service representative can literally work out of their homes, anywhere in the world, yet effectively support customers and clients. This permits implementing economical, truly geographically distributed call centers that are completely transparent to the customers or clients.

Another advantage of the invention is the ability to immediately resolve issues in the statements, with closure. Instead of having to mail a form to fill out after agreement is reached on how the issue will be resolved (say to make a correction). Now an electronic version can be immediately pushed to the clerk, where it can be immediately filled out and transmitted back, perhaps with help from the service representative, who can still be around and interactively assist.

Another advantage of the invention is the ability to have an immediate transcript of the clerk-service representative conversations. The transcript can "captured" by either party, or by one and sent to the other for acknowledgement. It can also be digitally signed, if its a transaction meriting that. Such transcripts can be archived and further used for training purposes or for analysis to improve business practices.

And another advantage of the invention is the ability to turn a question into a sales opportunity. When combined with security and digital signatures, in particular, what started as a question about a statement could turn into a signed transaction for additional goods or services to be executed by a vendor-provider.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF DRAWINGS

The purposes and advantages of the present invention will be apparent from the following detailed description in conjunction with the appended figures of drawings in which.

In the various figures of the drawings, like references are used to denote like or similar elements or steps.

DETAILED DESCRIPTION

Figure 1:
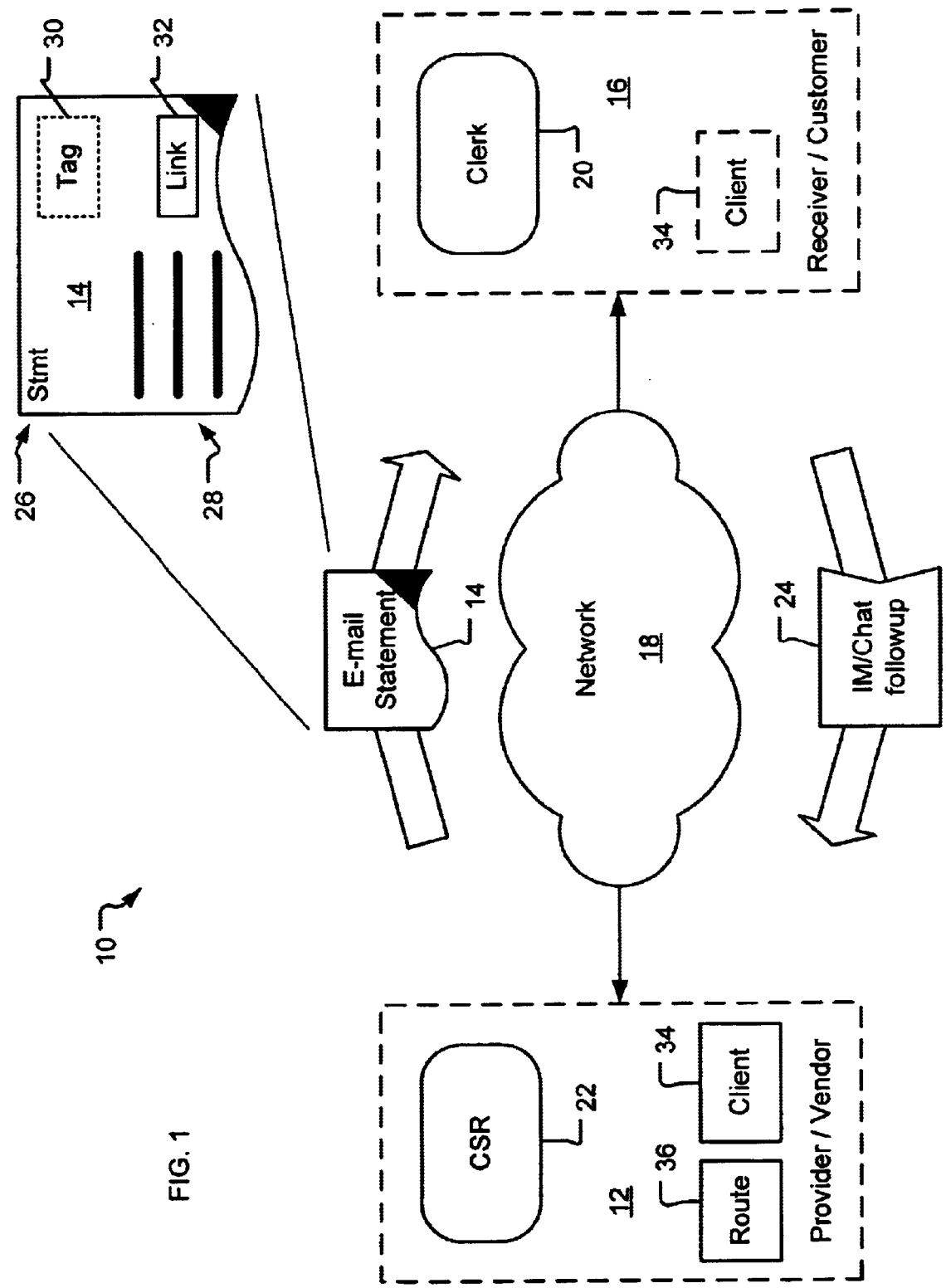
FIG. 1 is a schematic block diagram providing an overview of an embodiment according to the inventive interactive e-mail document system.

Best Mode for Carrying Out the Invention

A preferred embodiment of the present invention is an interactive e-mail document system. As illustrated in the various drawings herein, and particularly in the view of FIG. 1, this preferred embodiment of the invention is depicted by the general reference character 10.

FIG. 1 is a schematic block diagram providing an overview of an embodiment according to the inventive interactive e-mail document system (IEDS 10). Briefly, a provider 12 generates a statement 14 that is provided to a receiver 16 via a network 18. As is typically the case with statements, generally, a clerk 20 that is part of the organization of the receiver 16 may or may not need to communicate with a customer service or support representative (CSR 22) that is part of the organization of the provider 12. The statement 14 therefore permits initiation of an instant messaging or chat session (IM/chat 24) between the clerk 20 and the CSR 22.

As discussed in the Background Art section, and now extended to the context of the inventive IEDS 10, the provider 12 is, typically but not necessarily, an enterprise acting as a vendor or an organization needing to regularly communicate with its clients on standard matters. The receiver 16 is another enterprise or organization, but acting as a customer or a client that receives regular detailed communications from the provider 12. The statement 14 can encompass considerable breadth of data and formats. For instance, it can be virtually any document, including a statement of account, bills, lab reports, confirmation notices, other reports, or other results; it can be in text, html, or other formats; it can have image, audio, or animation elements incorporated, etc.

The provider 12 generates and provides the statement 14 to the receiver 16 in the general form of an e-mail. The e-mail format used can be essentially standard, or encryption, digital signatures, etc. can be employed. The inventive IEDS 10 does not necessarily foreclose the, concurrent use of such other sophisticated e-mail options. An insert in FIG. 1 shows more details of an exemplary statement 14 here. It includes a subject 26 that identifies the purpose of the e-mail as being a statement 14, and it includes data 28 intended for receiver 16, i.e., the statement of account, monthly billing, lab results, other report, etc. that constitutes the very purpose of the statement 14. The statement 14 also includes conventional e-mail header information, not shown. In particular, however, the statement 14 includes a tag 30 and a link 32.

The tag 30 provides client software 34 to be copied to the receiver 16, where it is then ready for use if the clerk 20 activates the link 32. The tag 30 is basically an Applet tag in an HTML document, here the statement 14. This has the usual behavior in that when the statement 14 is opened by the clerk 20, a browser attempts to load the object referenced by the tag 30, here the client software 34. It first checks the local cache and loads the client software 34 from there, if present. Otherwise it will request a download from a server as depicted. The server for this may be the provider 12, as shown, or another location accessible via the network 18. Once the client software 34 is loaded it is started, allowing the clerk 20 to engage in a live IM/chat 24 session with a CSR 22.

The receiver 16 may, understandably, have some concerns about allowing the dynamic downloading, installation, and automatic operation of software such as the client software 34. Various means exist to address such concerns and to insure that the client software 34 is safe. For instance, it can be downloaded from a trusted source or it can be vouched for by a trusted authority (i.e., signed). The security of the client software 34 is a matter of code signing, which is today supported by browsers directly and by code signing tools produced by the vendors who sell tools for writing downloadable code.

The link 32, when activated, causes the clerk 20 to be connected, via the network 18, to the CSR 22 in the IM/chat 24 session. The link 32 is, conceptually, and visually if desired, a "button" that the clerk 20 at the receiver 16 presses to employ an IM/chat 24 session. Of course, in some manner the clerk 20 would have to take an action in order to either load the client software 34 and run it, or simply run it assuming it was already loaded. Such a "lazy load" may be appropriate, since there is no point in incurring the downloading of the client software 34 every time a statement 14 is opened, particularly since it may not be needed a large percentage of the time. Alternately, depending on implementation, the clerk 20 need not press anything. Merely typing a message into a window that is already visible as a result of loading and running the client software 34 is also an option.

In general, the link 32 will initiate the IM/chat 24 session. However, the nature of the link 32 can also be to use an already opened IM/chat 24 window. That is, the link 32 may not, always have to explicitly open or activate the software for the IM/chat 24 this could already be running and available dust potentially not used).

In either case, once the clerk 20 indicates a desire to engage in the IM/chat 24 session, an instant messaging window becomes active on their screen (perhaps in the same browser window as the statement 14, perhaps in a new one) and the clerk 20 can begin typing. On the provider 12 side, routing software 36 is present that not only connects to an available (and perhaps "specialized" CSR 22), but then automatically opens a window on a device at that CSR 22 so that a dialog is initiated as if the clerk 20 had initiated a conversation with precisely that CSR 22. Depending on the level of sophistication desired, and as a straightforward matter of implementation, the routing software 36 can optimize which CSR 22 gets engaged in particular IM/chat 24 sessions. For example, without limitation, such optimization can be based on the identity of the receiver 16, characteristics of or about the clerk 20 (e.g., native language), the subject of the statement 14, a sub-topic within the statement 14 (e.g., if many links 32 are provided in the statement 14), the availabilities and expertise of a particular CSR 22, etc.

The nature of the IM/chat 24 sessions can also be optimized, depending on the sophistication desired and the implementation complexity. For example, the inventor contemplates that it will be popular in many embodiments of the IEDS 10 to include context meta-data, such as a copy of the very statement 14 which a clerk 20 is viewing. Based on experience with conventional, paper statements many experts feel that that this is the only way efficient communication can be guaranteed. "Back end" systems are regarded as not reliable enough to store read-only, non-mutable, exact copies of what is sent out. The inventive IEDS 10, however, is not limited to any particular approach here, and different embodiments can support variations as a matter of design or as user configurable options.

Only one link 32 is depicted in FIG. 1 but, as noted above, this is not a limitation and additional links 32 can be provided in the same statement 14. Say, to contact respective CSRs 22 in different departments or at different locations within the provider 12. For example, the provider 12 might be a large law firm and the receiver 16 might be an automobile manufacturer purchasing various legal services from offices of the provider 12 located in different cities. The statement 14 might then be a monthly invoice for those services. The provider 12 and the receiver 16 in such a scenario will typically have centralized accounting departments, lets say in Dallas and Detroit, respectively. If our hypothetical clerk 20 in Detroit needs to clarify a matter for a number for services performed by the provider's Los Angeles office, and to protest a duplicate charge in the same invoice by the provider's Denver office, the statement 14 can include respective links 32 to reach appropriate CSRs 22 in Dallas, Los Angeles, Denver, etc.

As another example, let us say our same automotive industry receiver 16 purchases seat-belts from a provider 12 with only one site, but with many departments within that single facility. The statement 14 here might be an invoice that is also supposed to include lab reports certifying that the product units meet department of transportation (DOT) standards. Let us now say that the clerk 20 has to follow up on whether specific units being invoiced for have actually shipped, as well as follow up regarding omitted lab report data for some other units. It follows that the use of different links 32 here can facilitate reaching appropriate quality control and shipping related CSRs 22.

Figure 2:
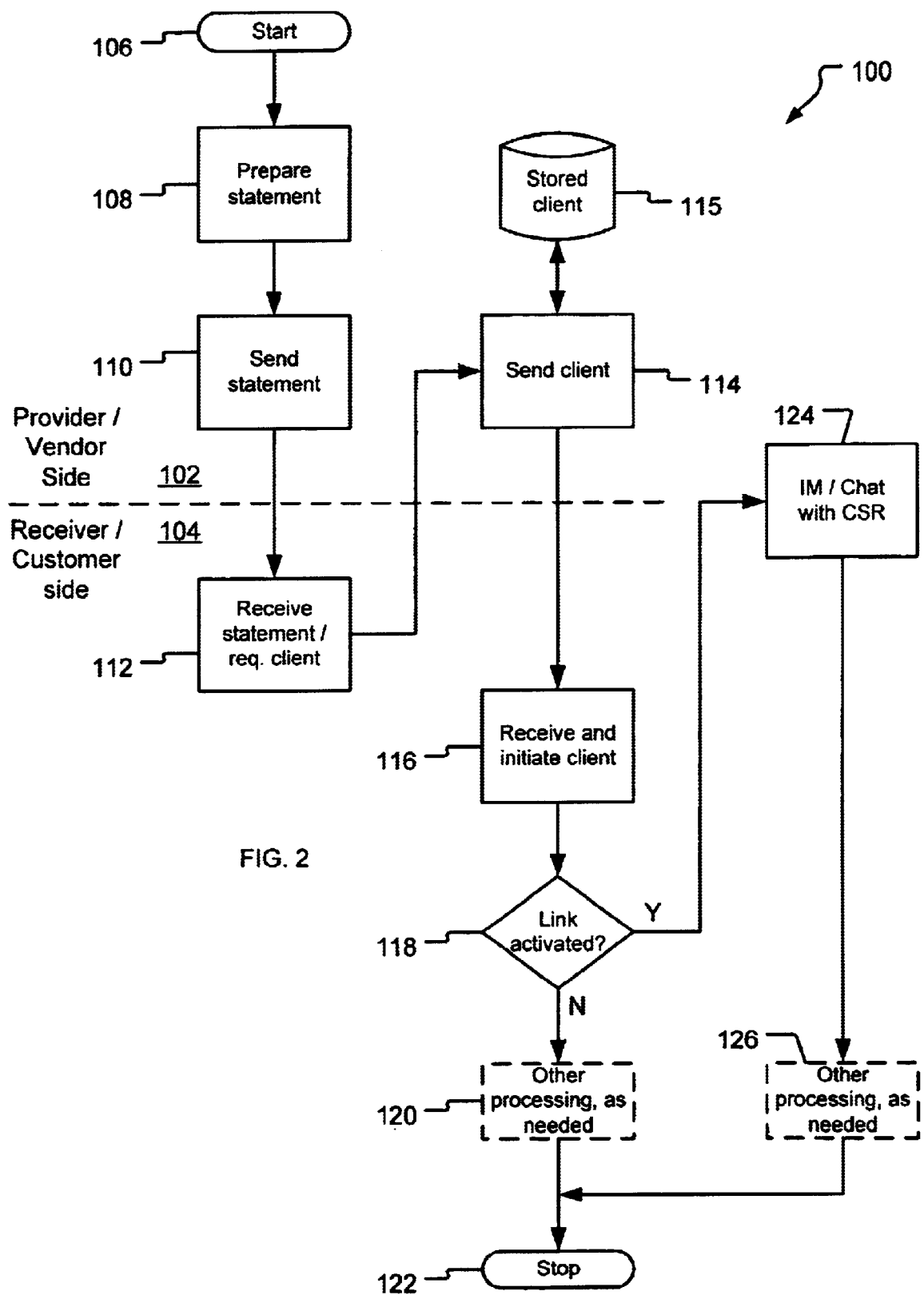
FIG. 2 is a flow chart depicting a process by which the invention may operate.

FIG. 2 is a flow chart depicting a process 100 by which the inventive IEDS 10 may operate. The process 100 has steps occurring at the provider 12, and thus shown in a provider/vendor region 102. The process 100 also has steps occurring at the receiver 16, and thus shown in a receiver/customer region 104.

The process 100 starts in a step 106, where conventional, optional set-up and initiation operations may occur. In a step 108 the statement 14 is prepared and in a step 110 it is sent to the receiver 16.

In a step 112 the receiver 16 receives the statement 14 and the tag 30 initiates a request for a copy of the client software 34. In a step 114 a copy of the client software 34 is retrieved from a storage 11S and sent to the receiver 16. Both step 114 and the storage 115 are shown here as being within the provider/vendor region 102 but, as previously discussed, that is not a requirement. Either or b of these may be elsewhere.

In a step 16 the receiver 16 receives and installs the client software 34. In a step 118 the clerk 20 either activates the link 32, or not. If the clerk 20 does not activate the link 32, say, because they have no issues with the statement 14 as received, in a step 120 other, conventional processing can occur and in a step 122 the process is complete. Conventional, optional wind-down and termination operations may occur in step 122.

Alternately, if the clerk 20 does activate the link 32, in a step 124 the IM/chat 24 session between the receiver 16 and the provider 12 takes place. Then, in a step 126 other, conventional processing can occur and in step 122 the process is also complete.

Figure 3:
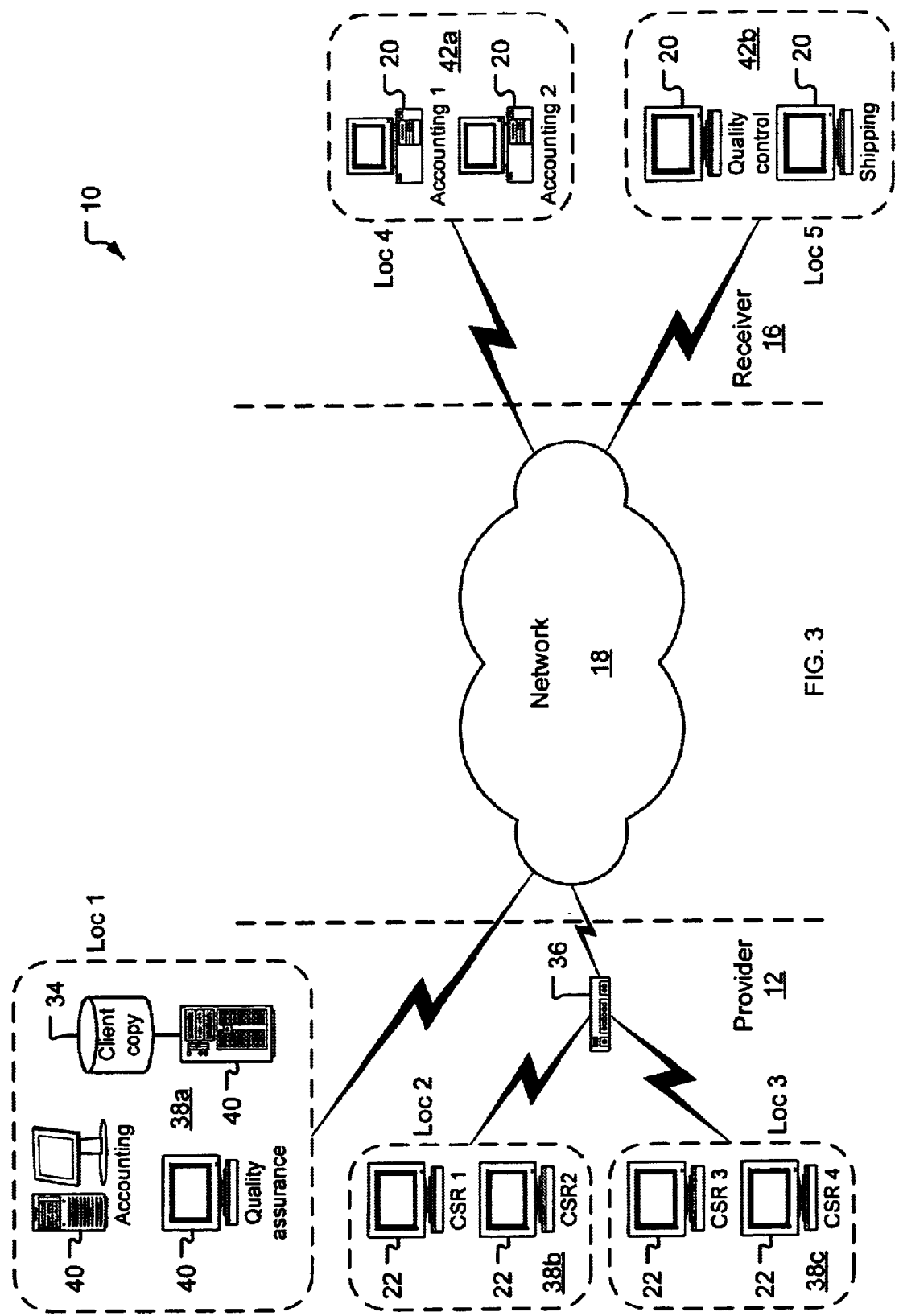
FIG. 3 is a schematic block diagram providing an overview of a complex embodiment according to the invention.

FIG. 3 is a schematic block diagram providing an overview of a complex embodiment according to the inventive IEDS 10. Here the provider 12 has three locations: a 1st location 38a, 2nd location 38b, and 3rd location 38c. The 1 st location 38a includes three provider systems 40, with two (marked "accounting" and "quality assurance" for example purposes) used by the provider 12 to construct and send the statements 14, and the other including a storage (marked "client copy") for serving the client software 34. The 2nd location 38b and 3rd location 38c here have two CSRs 22 each. The routing software 36 may, for instance, direct IM/chat 24 sessions to the 2nd location 38b or the 3rd location 38c based on business hours. However, as discussed previously, many different criteria can be used by the routing software 36, if it is present and if it is used.

The receiver 16 in FIG. 3 has two locations: a 4th location 42a and 5th location 42b. The 4th location 42a Includes clerks 20 (marked "accounting" for example purposes), and the 5th location 42b has more clerks 20 (marked "quality control" and "shipping" for example purposes here).

Despite its complexity, however, the embodiment of the IEDS 10 in FIG. 3 is merely a sophisticated extension of the underlying principles of the embodiment of the IEDS 10 in FIG. 1. The provider system 40 marked "accounting" can create billing statements 14 that are directed to the clerks 20 marked "accounting." The provider system 40 marked "quality assurance" can create lab report statements 14 that are directed to the clerk 20 marked "quality control." The clerk 20 marked "quality control" can forward a lab report statement 14 to the clerk 20 marked "shipping," and that clerk 20 can directly follow up with an IM/chat 24 session with a CSR 22 if desired. The clerks 20 can activate the links 32 to reach the CSRs 22 in whatever manner the IEDS 10 is configured. For instance, the CSR 22 marked "CSR1" can be "hard linked" so that it is communicated with only when a link 32 specifically requests it. The other CSRs 22 (marked "CSR 2," "CSR 3," and "CSR 4") can then be "soft linked" under control of the routing software 36. Thus, when the CSR 22 marked "CSR 2" is busy and the clerk 20 marked "accounting 2" activates a link 32, the routing software 36 can automatically direct the ensuing IM/chat 24 to either of the CSRs 22 marked "CSR 3" or "CSR 4." Furthermore, the CSR 22 marked "CSR 4," might not even be a human service representative. It might be an automated system, with the routing software 36 programmatically connecting a clerk 20 to it only when the other CSRs 22 are all busy.

While various embodiments have been described above it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present IEDS 10 is well suited for application to communicate statements 14 and then interactively communicate about such statements 14. As has been discussed herein with regard to the inventor's best mode and preferred embodiments, the inventive IEDS 10 meets its objectives and provides numerous advantages.

The IEDS 10 fulfills the current need for providers 12 to provide the statements 14 to receivers 16, and for the receivers 16 to then communicate back or "follow up" with the providers 12. In doing this, however, the invention may be largely implemented within and generally employ conventional mechanisms, such as existing computer systems, e-mail, instant messaging or chat, networks such as the Internet, and the design and support skills that already exist for such mechanisms. It then follows from this, that the invention is also highly economical.

For the above, and other, reasons, it is expected that the IEDS 1 OIEDS 10 of the present invention will have widespread industrial applicability. Therefore, it is expected that the commercial utility of the present invention will be extensive and long lasting.

What is claimed is:

1. A method for interactively communicating with regard to a statement, the method comprising the steps of:
    (a) preparing the statement in e-mail form to include a tag and a link, wherein the statement is prepared at a first computer system operated by a provider of the statement;
    (b) communicating the statement from said first computer system to a second computer system via a network, wherein said second computer system is operated by a clerk associated with a receiver of the statement;
    (c) providing a client software to said second computer system automatically based on said tag being present in the statement; and
    (d) employing an instant messaging session between said second computer system of said clerk and a third computer system based on selective activation of said link by said clerk, wherein said third computer system is operated by a service representative associated with said provider.

2. The method of claim 1, wherein said first computer system and said third computer system are the same.

3. The method of claim 1, wherein said step (c) includes providing said client software from a storage within a member of the set consisting of said second computer system of said receiver, said network, and said first computer system of said provider.

4. The method of claim 1, wherein:
    said provider has an associated plurality of said service representatives; and
    said step (a) includes including a plurality of said links in the statement, each suitable for initiating a respective said instant messaging session with a specific said service representative.

5. The method of claim 1, wherein:
    said provider has an associated plurality of said service representatives; and
    said step (c) includes routing said instant messaging session to a particular said service representative based on criteria set by said provider.

6. A method for constructing an interactive statement, the method comprising the steps of:
- (a) preparing an e-mail including data regarding subject matter of the statement, wherein said e-mail is prepared at a first computer system operated by a provider of the statement
- (b) including a tag in said e-mail, wherein said tag is suitable for providing an instant messaging client software in a second computer system operated by a clerk associated with a receiver of the statement; and
- (c) including a link in said e-mail, wherein said link is suitable for selective activation of said client software by said clerk to employ an instant messaging session with a third computer system operated by a service representative associated with said provider.

7. The method of claim 6, wherein said first computer system and said third computer system are the same.

8. The method of claim 6, wherein said tag is suitable for providing said client software from a storage within a member of the set consisting of said second computer system of said receiver, a network accessible by said second computer system, and any computer system of said provider.

9. The method of claim 6, wherein said step (c) includes including a plurality of said links in the statement, each suitable for initiating a respective said instant messaging session with a specific said service representative.

10. A method for interactively communicating about a statement, the method comprising the steps of:
- (a) receiving the statement at a first computer system operated by a clerk associated with a receiver of the statement, wherein the statement includes a tag and a link;
- (b) providing an instant messaging client software in said first computer system automatically based on said tag being present in the statement; and
- (c) activating said link selectively by said clerk, to employ an instant messaging session between said first computer system to a second computer system operated by a service representative associated with a provider of the statement.

11. The method of claim 10, wherein said tag is suitable for providing said client software from a storage within a member of the set consisting of said first computer system of said receiver, a network accessible by said first computer system, and any computer system of said provider.

12. The method of claim 10, wherein the statement includes a plurality of said links each suitable for initiating a respective said instant messaging session with a specific said service representative and said step (c) includes said clerk selectively activating one said link.

13. The method of claim 10, wherein the statement includes a plurality of said links each suitable for initiating a said instant messaging session with a specific said service representative, and the method further comprising:
- prior to said step (c), selecting a respective said link by said clerk; and
- in said (c) activating said respective said link selected by said clerk.

14. A statement embodied in a computer readable storage medium, comprising:
- a substantially conventional e-mail stored in the computer readable storage medium, wherein the computer readable storage medium is coupled with one of a first computer system of a provider that has created said e-mail, a second computer system of a clerk associated with a receiver that has received said e-mail, or a third computer system of a network wherein said e-mail is being communicated from said provider to said clerk;
- a tag included in said e-mail, wherein said tag is suitable for providing a client software in said second computer system of said clerk and said client software is suitable for conducting an instant messaging session between said clerk and a service representative associated with said provider; and
- a link included in said e-mail, wherein said link is suitable for selective activation by said clerk to employ said instant messaging session with said service representative.

15. The statement of claim 14, wherein said tag is suitable for providing said client software to said second computer system from a storage within a member of the set consisting of said second computer system of said receiver, said network, and said first computer system of said provider.

16. The statement of claim 14, wherein said tag is suitable for providing said client software from a storage accessible via said network and then execution of said client software at said second computer system.

17. The statement of claim 16, wherein said tag is suitable for providing said client software when said storage is within said provider.

18. The statement of claim 14, wherein:
- said provider has an associated plurality of said service representatives; and
- said link is suitable for employing said instant messaging session with a specific said service representative.

* * * * *